United States Patent
Cai

(10) Patent No.: US 9,030,986 B2
(45) Date of Patent: *May 12, 2015

(54) SYSTEM AND METHOD FOR DISCONTINUOUS RECEPTION CONTROL START TIME

(71) Applicant: BlackBerry Limited, Waterloo (CA)

(72) Inventor: Zhijun Cai, Ashburn, VA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/548,552

(22) Filed: Nov. 20, 2014

(65) Prior Publication Data

US 2015/0078238 A1    Mar. 19, 2015

Related U.S. Application Data

(63) Continuation of application No. 14/216,181, filed on Mar. 17, 2014, now Pat. No. 8,897,192, which is a continuation of application No. 13/287,731, filed on Nov. 2, 2011, now Pat. No. 8,811,250, which is a
(Continued)

(51) Int. Cl.
*H04W 24/00* (2009.01)
*H04W 52/02* (2009.01)
(Continued)

(52) U.S. Cl.
CPC ........ *H04W 52/0235* (2013.01); *H04W 40/005* (2013.01); *H04W 84/12* (2013.01); *H04W 24/00* (2013.01); *H04W 52/02* (2013.01);
(Continued)

(58) Field of Classification Search
None
See application file for complete search history.

(56) References Cited

U.S. PATENT DOCUMENTS 5,649,298 A    7/1997  Ablay
5,991,279 A    11/1999 Haugli et al.
(Continued)

FOREIGN PATENT DOCUMENTS

CA    2344911    12/2001
EP    529269     1/1999
(Continued)

OTHER PUBLICATIONS

3GPP TS 36.300 V8.1.0 (Jun. 2007) 3rd Generation Partnership Project; Technical Specification Group Radio Access Network' Evolved Universal Terrestrial Radio Access (E-UTRA) and Evolved Universal Terrestrial Radio Access Network (E-UTRAN); Overall Description; Stage 2 (Release 8); 106 pages.
(Continued)

*Primary Examiner* — Bunjob Jaroenchonwanit
(74) *Attorney, Agent, or Firm* — Fish & Richardson P.C.

(57) ABSTRACT

Methods of combining semi-persistent resource allocation and dynamic resource allocation are provided. Packets, such as VoIP packets, are transmitted on the uplink and downlink using respective semi-persistent resources. For each mobile device, awake periods and sleep periods are defined. The semi-persistent resources are aligned with the awake periods so that most of the time the mobile device can turn off its wireless access radio during the sleep periods. In addition, signalling to request, and to allocate, resources for additional packets are transmitted during the awake periods, and the resources allocated for the additional packets are within the awake periods. Methods of extending the awake periods in various embodiments are also provided. Methods of determining the first on period are also provided.

21 Claims, 9 Drawing Sheets

Related U.S. Application Data continuation of application No. 11/957,624, filed on Dec. 17, 2007, now Pat. No. 8,711,745.

(60) Provisional application No. 60/972,583, filed on Sep. 14, 2007.

(51) Int. Cl.

| | |
|---|---|
| H04W 76/04 | (2009.01) |
| H04W 40/00 | (2009.01) |
| H04W 84/12 | (2009.01) |
| H04W 72/04 | (2009.01) |
| H04W 72/12 | (2009.01) |

(52) U.S. Cl.
CPC .......... H04W 72/04 (2013.01); H04W 72/1273 (2013.01); H04W 52/0216 (2013.01); H04W 52/0209 (2013.01); H04W 76/048 (2013.01); H04W 72/1289 (2013.01)

(56) References Cited

U.S. PATENT DOCUMENTS

| | | |
|---|---|---|
| 6,104,929 A | 8/2000 | Josse et al. |
| 6,545,996 B1 | 4/2003 | Falco et al. |
| 6,622,251 B1 | 9/2003 | Lindskog et al. |
| 6,765,896 B1 | 7/2004 | Ahmed et al. |
| 6,917,598 B1 | 7/2005 | Emeott et al. |
| 6,973,052 B2 | 12/2005 | Wang et al. |
| 6,975,629 B2 | 12/2005 | Welin |
| 7,027,400 B2 | 4/2006 | O'Neill |
| 7,142,810 B2 | 11/2006 | Oesterling |
| 7,221,945 B2 | 5/2007 | Milford et al. |
| 7,366,124 B2 | 4/2008 | Lee et al. |
| 7,372,818 B2 | 5/2008 | Fraser et al. |
| 7,505,751 B1 | 3/2009 | Backes |
| 7,596,366 B2 | 9/2009 | Van Bosch et al. |
| 7,899,003 B2 | 3/2011 | Xu |
| 8,270,932 B2 | 9/2012 | Kim et al. |
| 2002/0064140 A1 | 5/2002 | Numminen |
| 2002/0154611 A1 | 10/2002 | Khullar |
| 2003/0021243 A1 | 1/2003 | Hamalainen |
| 2003/0039218 A1 | 2/2003 | Kwah |
| 2003/0157887 A1 | 8/2003 | Willenegger |
| 2003/0157899 A1 | 8/2003 | Trossen et al. |
| 2003/0185162 A1 | 10/2003 | Fraser et al. |
| 2004/0013095 A1 | 1/2004 | Western et al. |
| 2004/0042492 A1 | 3/2004 | Suzuki et al. |
| 2004/0093174 A1 | 5/2004 | Lander |
| 2004/0100911 A1 | 5/2004 | Kwan et al. |
| 2004/0114922 A1 | 6/2004 | Hardee |
| 2004/0185918 A1 | 9/2004 | Fan et al. |
| 2004/0196801 A1 | 10/2004 | Hiramatsu |
| 2004/0198371 A1 | 10/2004 | Balasubramanian et al. |
| 2004/0198411 A1 | 10/2004 | Cheng et al. |
| 2004/0210619 A1 | 10/2004 | Balachandran et al. |
| 2004/0253996 A1 | 12/2004 | Chen et al. |
| 2004/0264397 A1 | 12/2004 | Benveniste |
| 2004/0264433 A1 | 12/2004 | Melpignano |
| 2005/0007968 A1 | 1/2005 | Hsu et al. |
| 2005/0009578 A1 | 1/2005 | Liu |
| 2005/0047357 A1 | 3/2005 | Benveniste |
| 2005/0047387 A1 | 3/2005 | Frederiksen et al. |
| 2005/0063330 A1 | 3/2005 | Lee et al. |
| 2005/0063331 A1 | 3/2005 | Kim et al. |
| 2005/0113099 A1 | 5/2005 | Eriksson et al. |
| 2005/0128998 A1 | 6/2005 | Jelitto et al. |
| 2005/0135302 A1 | 6/2005 | Wang et al. |
| 2005/0180324 A1 | 8/2005 | Niemela et al. |
| 2005/0180325 A1 | 8/2005 | Niemela et al. |
| 2005/0181731 A1 | 8/2005 | Asghar et al. |
| 2005/0201353 A1 | 9/2005 | Lee et al. |
| 2005/0254444 A1 | 11/2005 | Meier et al. |
| 2005/0254459 A1 | 11/2005 | Qian |
| 2005/0281222 A1 | 12/2005 | Ranta-Aho et al. |
| 2006/0019641 A1 | 1/2006 | Vayanos et al. |
| 2006/0187897 A1 | 8/2006 | Dabbs et al. |
| 2006/0209669 A1 | 9/2006 | Nishio |
| 2006/0252449 A1 | 11/2006 | Ramesh |
| 2006/0256732 A1 | 11/2006 | Hamalainen |
| 2007/0004374 A1 | 1/2007 | Kneckt |
| 2007/0060167 A1 | 3/2007 | Damnjanovic et al. |
| 2007/0061433 A1 | 3/2007 | Reynolds et al. |
| 2007/0082620 A1 | 4/2007 | Zhang et al. |
| 2007/0087724 A1 | 4/2007 | Jang et al. |
| 2007/0135081 A1 | 6/2007 | Bultan et al. |
| 2007/0177630 A1 | 8/2007 | Ranta et al. |
| 2007/0201438 A1 | 8/2007 | Yoon et al. |
| 2007/0206524 A1 | 9/2007 | Suk |
| 2007/0230394 A1 | 10/2007 | Wang et al. |
| 2007/0254603 A1 | 11/2007 | Li et al. |
| 2007/0268861 A1 | 11/2007 | Diachina et al. |
| 2007/0286080 A1 | 12/2007 | Kim et al. |
| 2007/0286155 A1 | 12/2007 | Kaikkonen et al. |
| 2007/0291673 A1 | 12/2007 | Demirhan et al. |
| 2008/0090583 A1 | 4/2008 | Wang et al. |
| 2008/0095252 A1 | 4/2008 | Kim et al. |
| 2008/0101268 A1 | 5/2008 | Sammour et al. |
| 2008/0117891 A1 | 5/2008 | Damnjanovic et al. |
| 2008/0151828 A1 | 6/2008 | Bjorken et al. |
| 2008/0159183 A1 | 7/2008 | Lindoff et al. |
| 2008/0167089 A1 | 7/2008 | Suzuki et al. |
| 2008/0181127 A1 | 7/2008 | Terry et al. |
| 2008/0186893 A1 | 8/2008 | Kolding et al. |
| 2008/0186944 A1 | 8/2008 | Suzuki et al. |
| 2008/0192674 A1 | 8/2008 | Wang et al. |
| 2008/0192703 A1 | 8/2008 | Suzuki |
| 2008/0207229 A1 | 8/2008 | Cave et al. |
| 2008/0219376 A1 | 9/2008 | Qi et al. |
| 2008/0225772 A1 | 9/2008 | Xu |
| 2008/0232284 A1 | 9/2008 | Dalsgaard et al. |
| 2008/0232310 A1 | 9/2008 | Xu |
| 2008/0267105 A1 | 10/2008 | Wang et al. |
| 2008/0268863 A1 | 10/2008 | Pedersen et al. |
| 2008/0279170 A1 | 11/2008 | Malladi et al. |
| 2008/0287091 A1 | 11/2008 | Suzuki et al. |
| 2008/0287149 A1 | 11/2008 | Womack et al. |
| 2008/0310333 A1 | 12/2008 | Balachandran et al. |
| 2008/0311919 A1 | 12/2008 | Whinnett et al. |
| 2008/0311946 A1 | 12/2008 | Britton |
| 2008/0313300 A1 | 12/2008 | Alanara et al. |
| 2009/0029671 A1 | 1/2009 | Cho et al. |
| 2009/0034452 A1 | 2/2009 | Somasundaram et al. |
| 2009/0046627 A1 | 2/2009 | Xu |
| 2009/0054006 A1 | 2/2009 | Cai et al. |
| 2009/0180414 A1 | 7/2009 | Maeda et al. |
| 2009/0186614 A1 | 7/2009 | Aoyama et al. |
| 2009/0252089 A1 | 10/2009 | Lim et al. |
| 2009/0274107 A1 | 11/2009 | Park et al. |
| 2009/0310586 A1 | 12/2009 | Shatti |
| 2009/0327828 A1 | 12/2009 | Ojala et al. |
| 2010/0113054 A1 | 5/2010 | Iwamura et al. |
| 2010/0142485 A1 | 6/2010 | Lee et al. |
| 2010/0182965 A1 | 7/2010 | Sebire |
| 2010/0184443 A1 | 7/2010 | Xu |
| 2010/0202382 A1 | 8/2010 | Park et al. |
| 2010/0279715 A1 | 11/2010 | Alanara et al. |
| 2010/0309798 A1 | 12/2010 | Fodor et al. |
| 2011/0051657 A1 | 3/2011 | Li et al. |
| 2013/0021935 A1 | 1/2013 | Chun et al. |

FOREIGN PATENT DOCUMENTS

| | | |
|---|---|---|
| EP | 924890 | 8/2001 |
| EP | 1289181 | 3/2003 |
| EP | 1317156 | 6/2003 |
| EP | 1345349 | 9/2003 |
| EP | 1450240 | 8/2004 |
| EP | 1492263 | 12/2004 |
| JP | 2010-515334 | 5/2010 |
| KR | 10-2002-0002305 | 1/2002 |
| KR | 10-2004-0050422 | 6/2004 |
| KR | 10-2001-0080057 | 8/2011 |
| WO | 00/21236 | 4/2000 |

(56) References Cited

FOREIGN PATENT DOCUMENTS

| WO | 01/86885 | 11/2001 |
|---|---|---|
| WO | 02/33875 | 4/2002 |
| WO | 03/096707 | 11/2003 |
| WO | 2004/004194 | 1/2004 |
| WO | 2005/022772 | 3/2005 |
| WO | 2005/064952 | 7/2005 |
| WO | 2006/002379 | 1/2006 |
| WO | 2006/046754 | 5/2006 |
| WO | 2006/103498 | 10/2006 |
| WO | 2006/114710 | 11/2006 |
| WO | 2007/025138 | 4/2007 |
| WO | 2007/014021 | 5/2007 |
| WO | 2007/073118 | 6/2007 |
| WO | 2007/089797 | 8/2007 |

OTHER PUBLICATIONS

Alcatel-Lucent; "DL Control Signaling and Multiplexing for VoIP"; 3GPP TSG RAN WG1 Meeting #48bis (R1-071721); St. Julians, Malta; Mar. 26-30, 2007; 4 pages.
Dan Wu, Xuemail Gu, Qing Guo: "Blind Signal-to-Noise Ratio Estimation Algorithm with Small Samples for Wireless Digital Communications"—ICIC 2006, LNCIS 345, [Online] 2006, pp. 741-478.
Dottling et al.; "Efficient Channel Quality Feedback Schemes for Adaptive Modulation and Coding of Packet Data"; Vehicular Technology Conference, 2004, VTC2004-Fall; 2004 IEEE 60th; vol. 2; Sep. 26-29, 2004; pp. 1243-1247.
Ericsson; "Drx and VoIP"; TSG-RAN WG2 Meeting#59 (R2-073208); Athens, Greece; Aug. 20-24, 2007; 3 pages.
Ericsson; "Performance Gains on the Semi-Autonomous DRX Scheme for LTE"; 3GPP TSG-RAN WG2 Meeting #58bis (R2-072557); Orlando, Florida; Jun. 25-29, 2007; 6 pages.
Ericsson; "Semi-Persistent Scheduling"; TSG-RAN WG1 #46bis (R1-062863); Seoul, Korea; Oct. 9-13, 2006; 5 pages.
Ericsson; "Semi-Persistent Scheduling and DRX Control"; 3GPP TSG-RAN WG2 Meeting #55 (R2-062859); Seoul, Korea; Oct. 2006; 5 pages.
Ericsson; "Comparison of Scheduling Methods for LTE"; TSG-RAN WG2 Meeting #57 (R2- 070796); St. Louis, Missouri; Feb. 12-16, 2007; 5 pages.
Fukui, N.; "Study of Channel Quality Feedback in UMTS HSDPA"; 14th IEEE Proceedings on Personal, Indoor and Mobile Radio Communications, 2003, PIMRC 2003; vol. 1; Sep. 2003; pp. 336-340.
Jeon et al.; "Channel Adaptive CQI Reporting Schemes for UMTS High-Speed Downlink Packet Access"; Vehicular Technology Conference, 2006, VTC2006-Fall; 2006 IEEE 64th; Sep. 2006; pp. 1-5, 25-28.
Jiang, Dajie et al.; "Principle and Performance of Semi-Persistent Scheduling for VoIP in LTE System"; International Conference on Wireless Communications, Networking and Mobile Computing, 2007 (WiCom 2007); Sep. 21-25, 2007; pp. 2861-2864.
LG Electronics Inc.; "Uplink Scheduling for VoIP"; TSG RAN WG2 #56 (R2-063273); Riga, Latvia; Nov. 6-10, 2001; 3 pages.
Lucent Technologies; "Uplink Scheduling Requests for Real Time Services"; 3GPP TSG RAN2 #54 (R2-062227); Tallinn, Estonia; Aug. 28-Sep. 1, 2006; 5 pages.
NEC: "Persistent Scheduling and Dynamic Allocation" Submission to 3GPP TSG-RAN WG2 #55 (R2-062788); Seoul, Korea: Oct. 9-13, 2006; pp. 1-6.
Nokia; "Further Considerations on DL Semi-Persistent Scheduling"; 3GPP TSG-RAN WG2 Meeting #58 (R2-071743); May 7, 2007; 3 pages.
Nokia; "Scheduling of LTE DL VoIP"; 3GPP TSG-RAN WG2 Meeting #56bis (R2-070006); Sorrento, Italy; Jan. 15-19, 2007; 4 pages.
NTT DoCoMo, Inc.; "Comparison of Persistent Resource Allocation Schemes in LTE Uplink"; 3GPP TSG RAN WG2 #56 (R2-060283); Riga, Latvia; Jan. 15-19, 2007; 5 pages.
NTT DoCoMo, Inc.; "Uplink Grant Capacity in Response to RAN2 LS"; 3GPP TSG RAN WG1#49 (R1-072532); May 7, 2007; 7 pages.

NTT DoCoMo, Inc.; "Uplink Resource Allocation Scheme"; 3GPP TSG RAN WG2 #54 (R2-062164); Tallinn, Estonia; Aug. 28-Sep. 1, 2006; 5 pages.
NTT DoCoMo, Inc.; "Persistent Scheduling"; 3GPP TSG RAN WG2 Ad Hoc on LTE (R2-061920); Cannes, France; Jun. 27-30, 2006; 5 pages.
Research in Motion Limited; "Large IP Packet Delivery during VoIP Session"; 3GPP TSG=RAN WG2 Meeting #58bis (R2-072776); Orlando, Florida; Jun. 25-29, 2007; 3 pages.
Research in Motion Limited; "Semi-Persistent Scheduling and DRX Control"; 3GPP TSG-RAN WG2 Meeting#59 (R2-073245); Athens, Greece; Aug. 13, 2007; 5 pages.
Research in Motion Limited; "Semi-Persistent Scheduling and DRX Control"; 3GPP TSG-RAN WG2 Meeting #58bis (R2-072777); Orlando, Florida; Jun. 25-29, 2007; 5 pages.
Research in Motion Limited; "Uplink VoIP Scheduling with Fast Indication"; 3GPP TSG-RAN WG2 Meeting #58 (R2-071961); Kobe, Japan; May 7-11, 2007; 4 pages.
Samsung; "VoIP Support in LTE"; 3GPP TSG RAN WG1 Meeting #48 (R-1-070961); St. Louis, Missouri; Feb. 12-16, 2007; 6 pages.
Yan, et al.; Modeling UMTS Discontinuous Reception Mechanism; IEEE Transactions on Wireless Communications; vol. 4, No. 1; Jan. 2005; pp. 312-391.
Office Action issued in U.S. Appl. No. 11/969,082 on Mar. 1, 2011; 29 pages.
Office Action issued in U.S. Appl. No. 11/968,518 on Mar. 2, 2011; 34 pages.
Office Action issued in U.S. Appl. No. 12/193,991 on Mar. 16, 2011; 19 pages.
Office Action issued in U.S. Appl. No. 11/741,571 on Jun. 15, 2011; 20 pages.
U.S. Office Action issued in U.S. Appl. No. 11/741,571 on Dec. 5, 2011; 32 pages.
Office Action issued in U.S. Appl. No. 11/958,547 on Nov. 8, 2011; 38 pages.
Office Action issued in U.S. Appl. No. 11/966,074 on Oct. 7, 2011; 8 pages.
Office Action issued in U.S. Appl. No. 11/966,074 on May 10, 2012; 17 pages.
Office Action issued in U.S. Appl. No. 11/957,624 on Aug. 28, 2012; 10 pages.
Office Action issued in U.S. Appl. No. 11/957,624 on May 2, 2013; 11 pages.
Office Action issued in U.S. Appl. No. 11/957,624 on Nov. 22, 2013; 11 pages.
Advisory Action issued in U.S. Appl. No. 11/957,624 on Jan. 14, 2014.
Notice of Allowance issued in U.S. Appl. No. 11/957,624 on Feb. 6, 2014.
Office Action issued in U.S. Appl. No. 13/287,731 on Dec. 12, 2011; 12 pages.
Office Action issued in U.S. Appl. No. 13/287,731 on Mar. 23, 2012; 13 pages.
Office Action issued in U.S. Appl. No. 13/287,731 on Aug. 13, 2012; 8 pages.
Office Action issued in U.S. Appl. No. 13/287,731 on Nov. 15, 2012; 9 pages.
Office Action issued in U.S. Appl. No. 13/287,731 on Apr. 16, 2013; 10 pages.
Office Action issued in U.S. Appl. No. 13/287,731 on Nov. 19, 2013; 10 pages.
Notice of Acceptance issued in Australian Application No. 2007354841 on Nov. 11, 2011; 3 pages.
European Search Report issued in European Application No. 07107587 on Sep. 12, 2007; 2 pages.
European Search Report issued in European Application No. 07108885 on Dec. 20, 2007; 2 pages.
Extended European Search Report issued in European Application No. 07855581.0 on Sep. 29, 2010.
European Search Report issued in European Application No. 08162639 on Dec. 16, 2008; 2 pages.
European Search Report issued in European Application No. 08162615 on Dec. 16, 2008.

(56) References Cited

OTHER PUBLICATIONS

European Search Report issued in European Application No. 08162638.4 on Nov. 25, 2008; 8 pages.
Extended European Search Report issued in European Application No. 08733534.5 on Nov. 14, 2011; 13 pages.
Partial European Search Report issued in European Application No. 11176042.7 on Aug. 24, 2011; 7 pages.
European Search Report issued in European Application No. 11176042.7 on Nov. 14, 2011; 2 pages.
Extended European Search Report issued in European Application No. 11186711.5 on Nov. 25, 2011; 8 pages.
European Search Report issued in European Application No. 11186713.1 on Nov. 28, 2011; 3 pages.
European Search Report issued in EP Application No. 13169001.8 on Jun. 20, 2013; 2 pages.
English translation of Office Action issued in Japanese Application No. 2010-511453 on Mar. 2, 2012; 4 pages.
International Search Report issued in International Application No. PCT/CA2007/002368 on Apr. 17, 2008; 3 pages.
International Search Report issued in International Application No. PCT/CA2008/000003 on Apr. 17, 2008; 2 pages.
International Search Report issued in International Application No. PCT/CA2007/002311 on Mar. 13, 2008; 3 pages.
International Search Report issued in International Application No. PCT/CA2007/002299 on May 21, 2008; 2 pages.
International Search Report issued in International Application No. PCT/CA2008/000001 on Apr. 24, 2008; 2 pages.
International Search Report issued in International Application No. PCT/CA2008/000770 on Aug. 8, 2008; 1 page.
International Search Report issued in International Application No. PCT/CA2008/000771 on Aug. 1, 2008; 1 page.
International Search Report issued in International Application No. PCT/US2008/073593 on Feb. 28, 2009; 2 pages.
International Search Report issued in International Application No. PCT/US2008/073585 on Feb. 6, 2009; 4 pages.
International Search Report issued in International Application No. PCT/US2008/073580 on Dec. 26, 2008; 2 pages.

US 9,030,986 B2

SYSTEM AND METHOD FOR DISCONTINUOUS RECEPTION CONTROL START TIME

RELATED APPLICATIONS

This application is a continuation of U.S. application Ser. No. 14/216,181 filed on Mar. 17, 2014, which is a continuation of U.S. patent application Ser. No. 13/287,731 filed Nov. 2, 2011 and issued as U.S. Pat. No. 8,811,250 on Aug. 19, 2014, which is a continuation of U.S. patent application Ser. No. 11/957,624 filed Dec. 17, 2007 and issued as U.S. Pat. No. 8,711,745 on Apr. 29, 2014, which claims priority to U.S. Provisional Application No. 60/972,583 filed Sep. 14, 2007, the applications are hereby incorporated by reference in their entirety.

FIELD OF THE APPLICATION

The application relates to wireless communication, and more particularly to transmission scheduling for wireless communication.

BACKGROUND

With semi-persistent scheduling, for downlink VoIP (voice over IP (Internet Protocol)) communications to a mobile device, a periodic DL (downlink) transmission resource is allocated during a talk-spurt on the downlink. The same resource is allocated each time. The allocation is turned on during each of the talk-spurts and off between talk-spurts. In this manner, explicit signalling to request an allocation, and to grant a particular VoIP allocation is not required. Semi-persistent scheduling for uplink VoIP communications from a mobile station is similar.

In addition to regular VoIP traffic, mobile devices also need the ability to send and transmit larger IP packets. Such larger IP packets are likely to be relatively infrequent compared to the frequency of regular VoIP transmissions. Such packets might include uncompressed IP packets, RTCP (Remote Transmit Power Control) packets, SIP/SDP (Session Initiation Protocol/Session Description Protocol) packets, etc. Such IP packets may be several hundreds of bytes in size and may have high priority. In addition, larger packets may be required to transmit RRC (Radio Resource Control) Signalling messages. Examples of this are handover related messages such as measurement reports. Some mobile devices will also need the ability to deliver a mixed service in which case services in addition to VoIP need to be provided to the mobile device, such as e-mail, web browsing etc.

BRIEF DESCRIPTION OF THE DRAWINGS

Embodiments will now be described with reference to the attached drawings in which.

DETAILED DESCRIPTION OF EMBODIMENTS

Figure 1:
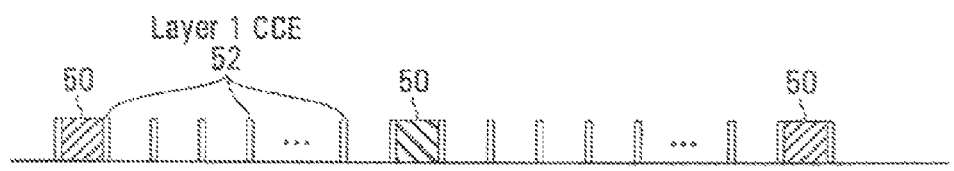
FIG. 1 is a signalling diagram showing dynamic scheduling vs. semi-persistent scheduling.

According to one broad aspect, the application provides a method in a network for the network to provide wireless communications to a mobile device, the method in the network comprising: transmitting by the network discontinuous reception control parameters to a mobile device, the discontinuous reception control parameters indicating periods during which the mobile device will have its receiver powered on once discontinuous reception control is active; determining by the network a first of said periods during which the mobile device will have its receiver powered on and after which discontinuous reception control will be active; and transmitting by the network to the mobile device in accordance with the discontinuous reception control parameters starting with the first of said periods.

According to another broad aspect, the application provides a method in a mobile device for the mobile device to receive wireless communications from a network, the method in the mobile device comprising: receiving by the mobile device discontinuous reception control parameters from the network, the discontinuous reception control parameters indicating periods during which the mobile device will have its receiver powered on once discontinuous reception control is active; determining by the mobile device a first of said periods during which the mobile device will have its receiver powered on and after which discontinuous reception control will be active; and receiving by the mobile device communications from the network in accordance with the discontinuous reception control parameters starting with the first of said periods.

According to another broad aspect, the application provides an apparatus for providing communications services to a mobile device, the apparatus comprising: a DRX (discontinuous reception) controller that determines discontinuous reception control parameters for a mobile device, the discontinuous reception control parameters indicating periods during which the mobile device will have its receiver powered on once discontinuous reception control is active; the DRX controller being further configured to determine a first of said periods during which the mobile device will have its receiver powered on and after which discontinuous reception control will be active; and a transceiver and at least one antenna for establishing a wireless link with the mobile device, the transceiver being used to transmit the discontinuous reception control parameters to the mobile device and to transmit to the mobile device in accordance with the discontinuous reception control parameters starting with the first of said periods.

According to another broad aspect, the application provides a mobile device comprising: a wireless access radio for receiving wireless communications from a network; a radio manager that controls when the wireless access radio is on and when the wireless access radio is off; the radio manager configured to perform the control of the wireless radio access in accordance with discontinuous reception control parameters from the network via the wireless access radio, the discontinuous reception control parameters indicating periods during which the mobile device will have its receiver powered on once discontinuous reception control is active; and the radio manager further configured to determine a first of said periods during which the mobile device will have its receiver powered on and after which discontinuous reception control will be active such that the mobile device receives from the network in accordance with the discontinuous reception control parameters starting with the first of said periods.

Further embodiments provide computer readable media having computer executable instructions stored thereon, for execution by a wireless device or network device for example, that control the execution of one or more of the methods summarized above, or described below.

Dynamic scheduling has been proposed to allow the dynamic allocation of transmission resources, and the subsequent transmission of a large packet using the dynamically allocated resources. Dynamic scheduling involves allocating a resource each time a packet is to be transmitted, and the resource can differ for each allocation. In a particular example, see Applicant's co-pending U.S. Provisional Patent Application No. 60/944,367 filed on Jun. 15, 2007 and hereby incorporated by reference in its entirety.

In a specific example, a mobile device supporting VoIP with dynamic scheduling monitors layer 1 CCEs (Control Channel Elements) continuously for dynamic scheduling grants even though the mobile device might be only involved in a VoIP session. LTE (Long Term Evolution) refers to CCEs, but the term has more general application to mean simply control information.

As indicated above, a mobile device may support VoIP with dynamic scheduling by monitoring layer 1 CCEs continuously for dynamic scheduling grants. Unfortunately, this might waste battery power for the mobile device, particularly when there are very few or even no dynamic scheduling grants for the mobile device.

Referring now to FIG. 1, shown is a signalling diagram showing dynamic scheduling vs. semi-persistent scheduling. Time is on the horizontal axis. Shown is a periodic semi-persistent allocation 50. For VoIP transmission, this can for example include a resource allocated every 20 ms. In addition, there is a regular set of layer 1 CCEs 52 that are transmitted. In the illustrated example, these are transmitted in every 1 ms but it is to be clearly understood that the other resource allocation periods and CCE periods are possible. This example assumes downlink transmission, but a similar approach applies to uplink transmission. During the periods that occur between talk-spurts, (also referred to as "silence" or "silence periods"), the transmitter and receiver can be turned off. During a talk-spurt period (also referred to as a period that VoIP transmission is "active", or "active mode"), if not for dynamic scheduling, the mobile device could wake up regularly to blind-detect its data in the semi-persistently allocated resource at the pre-defined interval (e.g. every 20 ms) while entering a "sleeping" mode at other times. This can also be referred to as DRX (discontinuous reception). This simply means that the receive capability of the mobile device's radio is basically turned off while the mobile device is in sleep mode thereby resulting in battery life extension. However, given that other data may arrive via dynamic scheduling by any of the CCEs 52, the mobile device needs to monitor the CCEs of all sub-frames. In the full dynamic scheduling case there is no DTX or DRX and this rules out the possibility of using DRX since the mobile device needs to continue monitoring the layer 1 CCEs for dynamic scheduling grants for possible data coming. This is not power efficient and leads to lower battery charge lifetimes.

To efficiently support the DRX in VoIP active mode in order to reduce the battery power consumption, systems and methods are provided for combining semi-persistent scheduling for VoIP with a scheduling capability for additional packet transmission. These methods are particularly effective for a mobile device that is only involved in a VoIP session (i.e. not requiring mixed service).

System for Semi-Persistent Scheduling and DRX Control

Figure 2:
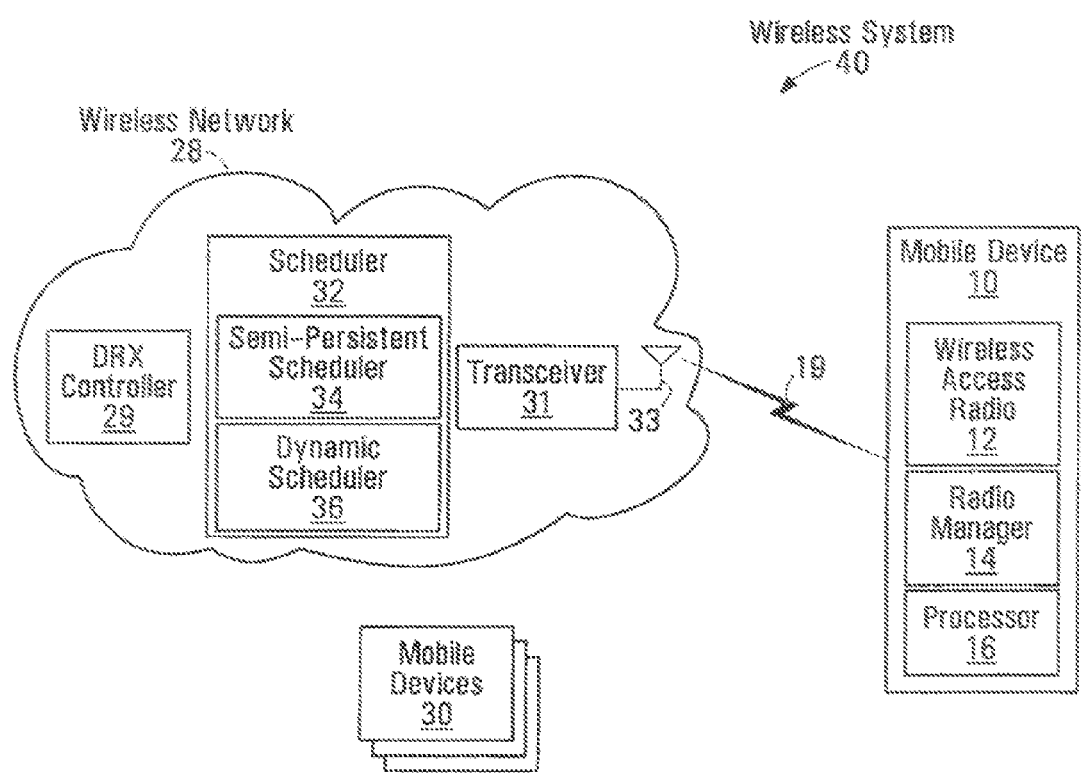
FIG. 2 is a block diagram of an example wireless system.

Referring now to FIG. 2, shown is a block diagram of an example wireless system 40. The wireless system 40 has a wireless network 28 and a mobile device 10. The wireless system also has other mobile devices 30.

The mobile device 10 has a wireless access radio 12, a processor 16 and a radio manager 14 that is responsible for controlling the wireless access radio 12 and performing radio resource control. There may be additional components not shown. The radio manager 14 may be implemented in software running on appropriate hardware, hardware, firmware or combinations thereof.

The wireless network 28 has a scheduler 32 that encompasses a semi-persistent scheduler 34 and a dynamic scheduler 36. The wireless network 28 has components such as base stations (not shown) for providing wireless access. These include a transceiver 31 having at least one antenna 33. The scheduler 32 may reside in a base station or elsewhere in the network 28. In LTE, the scheduler is typically in the eNB (enhanced NodeB). In the examples that follow, it is assumed that scheduler 32, transceiver 31 and antenna 33 are all parts of a base station. Also shown is a DRX controller 29 that is responsible for setting up/configuring/obtaining knowledge of the DRX behaviour for each mobile device. The DRX controller 29 may be part of a base station and may be implemented in software running on appropriate hardware, hardware, firmware or combinations thereof.

In the illustrated example, the scheduler 32 and radio manager 14 are implemented as software and executed on processors forming part of the network 28 and mobile device 10 respectively. However, more generally, these functions may be implemented as software, hardware, firmware, or any appropriate combination thereof.

Furthermore, it is to be understood that the wireless network would have any appropriate components suitable for a wireless network 28. Note that the wireless network may include wires that interconnect network components in addition to components for providing wireless communication with mobile devices. The components of the wireless network are implementation specific and may depend on the type of wireless network. There are many possibilities for the wireless network. The wireless network might for example be a UMTS network or any cellular network that uses semi-persistent resource assignment.

In operation, the mobile device 10 communicates with the wireless network 28 over a wireless connection 19 between the mobile device 10 and the wireless network 28. The communication with the wireless network 28 includes VoIP packet transmission and additional packet transmission. The semi-persistent scheduler 34 is responsible for making an initial resource allocation for a VoIP service to the mobile device 10. This includes an uplink semi-persistent allocation and a downlink semi-persistent allocation. The semi-persistent scheduler 34 is also responsible for keeping track of whether there is a talk-spurt in progress for the uplink and/or the downlink and for turning on and off the uplink and/or downlink allocation accordingly. While de-allocated, the semi-persistently allocated resources can be made available for other purposes. Note that the form of the transmission resources that are being allocated is implementation specific. Particular examples of resources that might be used include OFDM resources and CDMA resources. The dynamic scheduler 36 is responsible for making resource allocations for additional packet transmissions that are not accommodated by the semi-persistent allocation. The additional packets may be related to and/or form part of the VoIP service, or be unrelated to the VoIP service.

The radio manager 14 controls the on/off state of the wireless access radio 12. In some wireless access radios, the transmitter and receiver must be turned on and off together, and as such, uplink and downlink scheduling must be coordinated to allow the wireless access radio to be turned off. In some wireless access radios, receive and transmit capabilities can be independently turned off.

In some embodiments, the network 28 sends DRX control signalling to the mobile device 10 that sets a repeating pattern that has a DRX period having an awake period and a sleep period. An example could be: DRX period is 20 ms with sleep period equal to 15 ms and awake period equal to 5 ms. During the awake period, the mobile device turns its receiver on. During the sleep period, the mobile device turns its receiver off. This signalling might be sent at the start of each VoIP session, for example.

In some embodiments, the DRX controller 29 transmits DRX control parameters to the mobile device to set up DRX control. In addition, the DRX controller 29 determines when DRX control is to start. Specific examples are provided below under the heading "Controlling the Start of DRX Control". In some embodiments, the DRX controller is a piece of base station software running on a processor in a base station that controls the DRX procedure. It may be incorporated into the base station radio resource control software or radio resource management software.

In the mobile device 10, the wireless access radio 12 receives wireless communications from the network 28. The radio manager 14 controls when the wireless access radio 12 is on and when the wireless access radio is off in accordance with DRX control parameters received from the network. Specific detailed examples are provided below. In addition, the radio manager further 14 is further configured to determine a first of the periods during which the mobile device will nominally have its receiver powered on and after which discontinuous reception control will be active such that the mobile device receives from the network in accordance with the discontinuous reception control parameters starting with the first of said periods. Various detailed examples are provided below under the heading "Controlling the Start of DRX Control".

Figure 3:
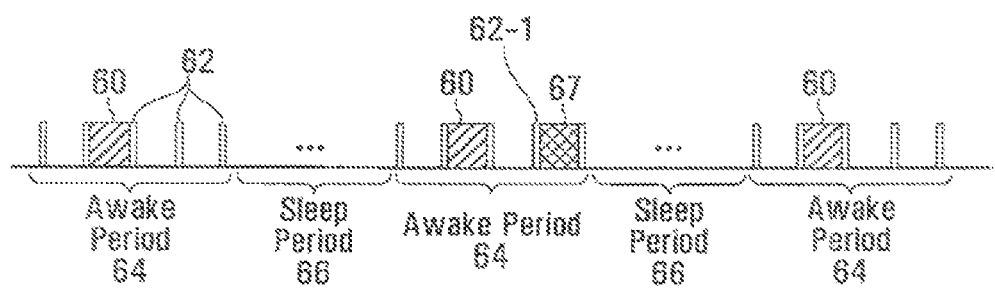
FIG. 3 is a signalling diagram showing an awake period for dynamic scheduling in DRX (discontinuous reception)

Referring now to FIG. 3, shown is a signalling diagram showing an example of semi-persistent and dynamic scheduling and DRX. Shown is a semi-persistent allocation 60 available for semi-persistent VoIP DL transmissions. In addition, there are layer 1 CCEs 62 for signalling dynamic allocations so as to allow the transmission of additional packets. This represents the transmissions from the base station. The mobile device receiving the transmissions alternates between being in an awake state and a sleep state. The mobile station is in an awake state during awake periods 64 and the mobile device is nominally in a sleep state during sleep periods 66. The first thing that the scheduler in the network needs to do is to ensure that the semi-persistent allocation 60 coincides with the awake periods 64. In addition, each awake period 64 is longer than the minimum necessary to transmit the VoIP semi-persistent allocation. There is also the opportunity to dynamically schedule (as signalled on one of the CCEs 62) and transmit an additional packet. An example of this is shown where a dynamic allocation is signalled in CCE 62-1. Additional packet 67 is shown transmitted immediately following CCE 62-1. The additional packet might for example be an RTCP packet, SIP/SDP packet, or a packet that has not undergone IP\UDP\RTP header compression, etc. While the mobile device is in the sleep state, it operates in a reduced power consumption mode, by turning off reception capability and/or by turning off its reception and transmission capabilities. In this example, the network has scheduled the additional packet 67 to be transmitted during one of the awake periods 64, and signals this using a CCE 62-1 that is transmitted during one of the awake periods 64. More generally, when the mobile device wakes up after a sleep period, the mobile device will not only blind detect its own VoIP data on the semi-persistently allocated resource 60, but also will detect, more generally attempt to detect, all the CCEs during the awake periods.

In some embodiments, after the mobile device determines that there will be a dynamically allocated resource for the mobile device as signalled in one of the CCEs in a given awake period, the mobile device does not monitor further CCEs during that awake period.

In some embodiments, the base station will transmit signalling to configure the mobile device with this DRX behaviour, and thereafter all the dynamic scheduling will occur only in this "awake period". For example, the mobile device may sleep every 15 ms, and then wake up for 5 ms to continuously receive data. The behaviour repeats with a period of 20 ms. During the 5 ms awake period, the mobile device will blind-detect its VoIP data on the semi-persistently allocated resource and also the mobile device will monitor all the CCEs. The base station understands this DRX configuration and will schedule the associated dynamic packets such as RTCP, SIP/SDP, etc, during this 5 ms awake period. In some implementations, when a retransmission occurs, the mobile device will be in continuous mode by default.

The radio manager 14 controls the operation of the wireless access radio 12 such that a reception capability is powered on during the awake periods, and off for at least some of the sleep periods. As described below, it may be necessary for the reception capability to be on during some of the sleep periods to allow for retransmissions.

The signalling for dynamic scheduling is performed during the awake periods. In addition, the actual resources allocated for the additional packet transmissions are scheduled to occur during the awake periods.

In some embodiments, when it becomes necessary for a retransmission, the mobile device enters a continuous mode of operation. While in continuous mode, the mobile device continuously receives and monitors the downlink channel and does not turn off reception capability. Further, in some embodiments, if a mixed service needs to be provided to the mobile device, this is used as a trigger to also enable the continuous mode operation. This trigger may be dependent on the traffic QoS of the service being added.

Uplink Semi-Persistent Alignment with Downlink for DRX

Figure 4:
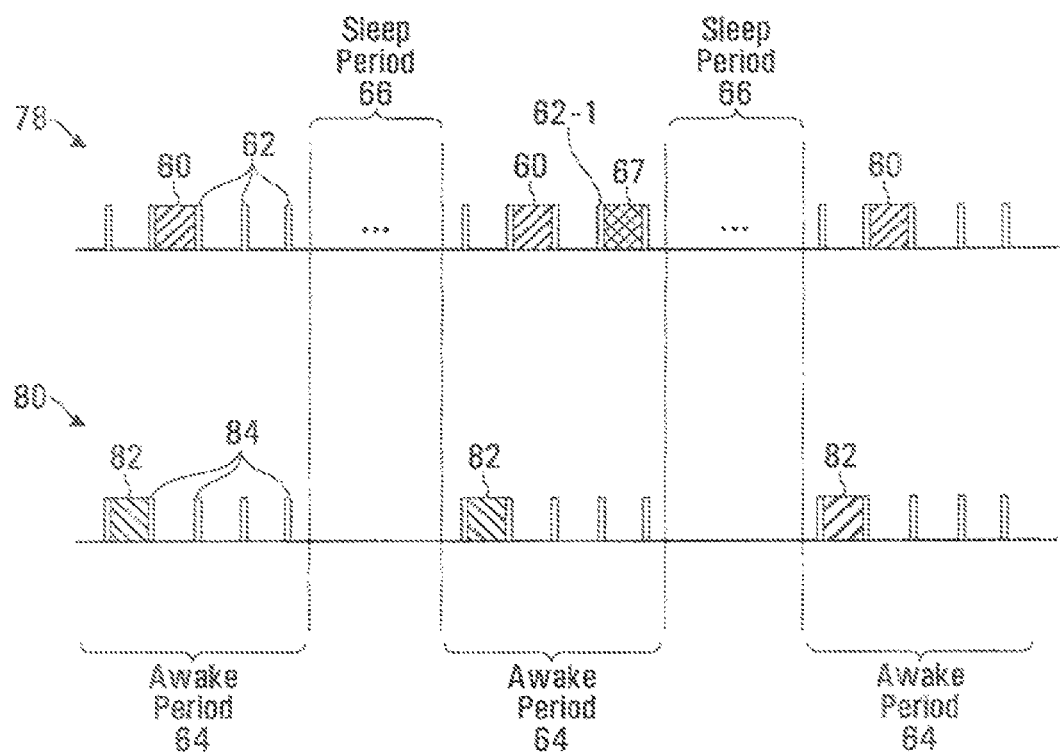
FIG. 4 is a signalling diagram showing DRX and DTX (discontinuous transmission) for uplink and downlink.

The above discussion is focussed on downlink transmission from the base station to the mobile device and on the mobile device's ability to turn off its reception capability during the sleep period. However, some mobile devices are not able to turn off only their reception capability while leaving on a transmit capability or vice versa. Thus, for such devices in order to fully realize the benefit of having an awake period and a sleep period for reception, uplink transmissions should are also scheduled to align with these awake periods and sleep periods. An example of this is shown in FIG. 4. In FIG. 4, the downlink transmission is indicated at 78 and this is basically the same as that described above with reference to FIG. 3, and this will not be described again. The uplink transmissions are generally indicated at 80. Here, there is a semi-persistent allocation 82 for VoIP UL transmissions. These are scheduled to occur during the periods 64 that the mobile device is awake. In addition, an uplink control channel is indicated at 84. In the illustrated example, this occurs every 1 ms. The mobile device only transmits the uplink control channel during the awake periods 64. The mobile device can use the uplink control channel to make requests for additional resources. By scheduling the uplink semi-persistent transmission and downlink semi-persistent transmission to occur during the same awake period, the mobile device can realize much more efficient DRX and DTX (discontinuous reception and discontinuous transmission) behaviour. In the example of FIG. 4, the mobile device is configured to sleep every 15 ms, and then wake up for 5 ms. During this 5 ms awake period, the mobile device will receive DL semi-persistent reception if available (during a DL talk-spurt) and make an uplink semi-persistent transmission if available (during an UL talk-spurt). The mobile device will also detect all the DL grants and possibly make uplink additional resource requests.

In case of retransmissions (either the DL or the UL), the mobile device will enter the continuous mode by default. Note that both the uplink and downlink VoIP semi-persistent allocations have the same traffic characteristics (every 20 ms), hence the base station can easily align the semi-persistent allocation for the DL and UL.

With this approach, even in the active mode (talk-spurt in progress on the uplink or the downlink), the mobile device can be in DRX and DTX mode most of the time. The mobile device monitors the Layer 1 CCEs on the downlink only during the awake period, and may request more resources on the uplink. This can save battery power for the mobile device. Considering that an additional IP packet delivery during a VoIP session may be infrequent, the battery saving could be significant. A drawback is that the dynamic scheduling could be delayed by an additional 10 ms on average.

Figure 5:
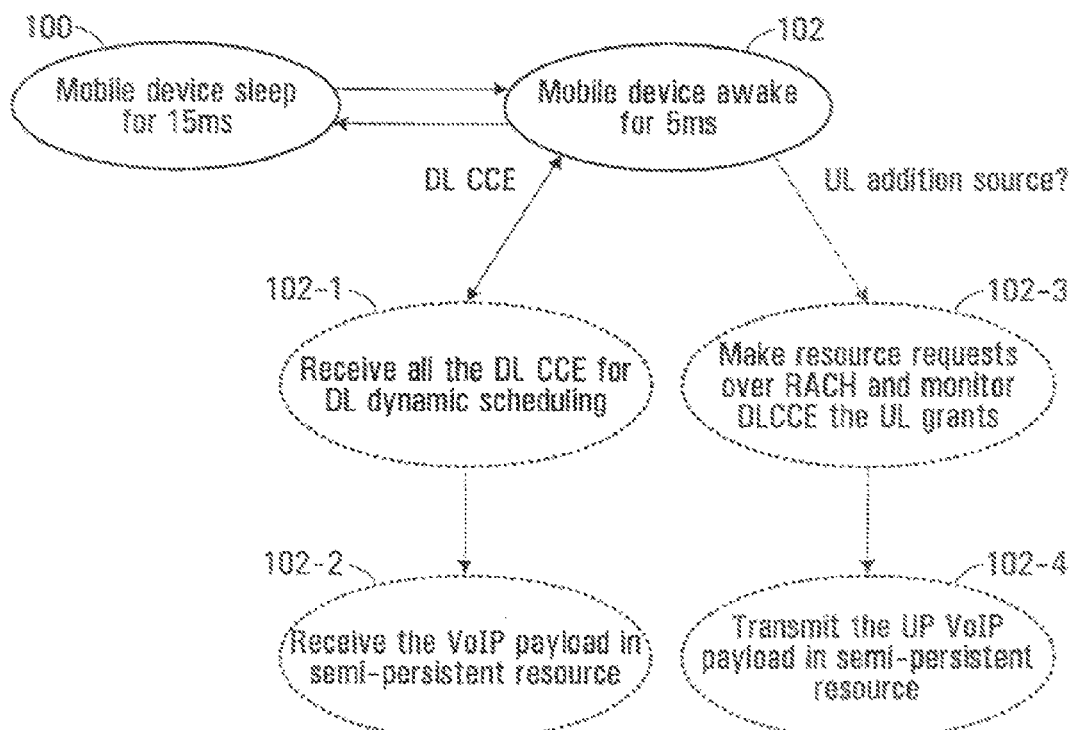
FIG. 5 is a state diagram having DRX and DTX transitions for VoIP.

Referring now to FIG. 5, shown is a state diagram having DRX/DTX state transitions for VoIP. It is noted that when there is no uplink and downlink transmission (i.e. silence in both directions), the mobile device only needs to monitor the DL CCEs for dynamic scheduling during the awake period. There are two main states. The first main state is the mobile device sleep state 100 and the second main state is the mobile device awake state 102. For the illustrated example, it is assumed that the sleep state 100 lasts 15 ms and the awake state lasts 5 ms and can be extended, but this is again implementation specific. Steps 102-1 and 102-2 are executed for downlink communication during the awake state 102. Step 102-1 involves receiving all of the downlink CCEs and processing them to identify downlink dynamic scheduling if present. This is done irrespective of whether or not there is any downlink VoIP transmission. In the event that a downlink talk-spurt is ongoing, then step 102-2 is also executed. This involves receiving the VoIP payload in the semi-persistent resource. Steps 102-3 and 102-4 are executed in respect of uplink transmissions. Step 102-3 is only executed if the mobile device determines that it needs a dynamic allocation for uplink transmission. Step 102-3 involves making a resource request, for example over a random access channel, and monitoring the downlink CCE for uplink grants. In addition, if there is an uplink talk-spurt in progress, then the mobile device will execute step 102-4 which involves transmitting the uplink VoIP payload in the semi-persistent resource for uplink transmission.

The above description has focussed on applications where the traffic that is sent using the semi-persistent allocation is VoIP traffic. More generally, the same methods and systems can be applied to combine the transmission and scheduling of traffic of any type on a semi-persistently allocated resource with the transmission and scheduling of traffic that uses dynamic resource allocations.

In the above examples, CCEs spaced by 1 ms are used for the downlink control channel. More generally, the downlink control channel can take any form. The only limitation is that dynamic allocations for a given mobile device take place during awake periods for the mobile device. Similarly, at least in the figures, the uplink control channel has been depicted as a random access channel that is available at intervals spaced by 1 ms. More generally, the uplink control channel for requesting additional resource allocations can come in any form. The only limitation is that requests for dynamic allocations for uplink transmission from a given mobile device will need to be transmitted during awake periods for the mobile device.

In some embodiments, the additional packet is transmitted as a series of one or more sub-packets formed by segmenting the additional packet. These are subject to reassembly at the receiver.

Figure 6:
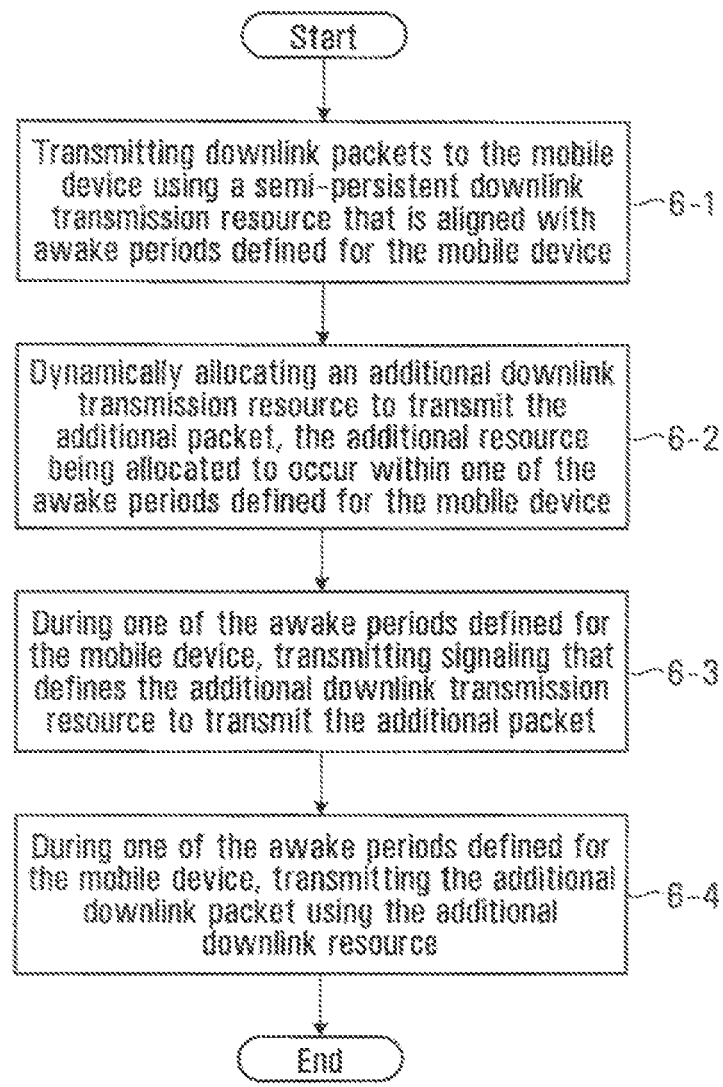
FIGS. 6 and 7 are flowcharts of methods executed by a network to perform combined semi-persistent and dynamic scheduling.

Methods for Semi-Persistent Scheduling and DRX Control Executed by the Wireless Network A method in a wireless network for performing downlink transmission to mobile devices will be described with reference to the flowchart of FIG. 6. These steps are performed for each mobile device being provided wireless access on a semi-persistent downlink transmission resource. The method begins at step 6-1 with transmitting downlink packets to the mobile device using a semi-persistent downlink transmission resource that is aligned with awake periods defined for the mobile device. These can be downlink VoIP packets during a downlink talk-spurt for a VoIP session involving the mobile device or otherwise. Steps 6-2, 6-3, 6-4 are executed for each additional downlink packet for the mobile device. In step 6-2, the wireless network dynamically allocates an additional downlink transmission resource to transmit the additional packet, the additional resource being allocated to occur within one of the awake periods defined for the mobile device. In step 6-3, during one of the awake periods defined for the mobile device, the wireless network transmits signaling that defines the additional downlink transmission resource to transmit the additional packet. In step 6-4, during one of the awake periods defined for the mobile device, the wireless network transmits the additional downlink packet using the additional downlink resource. In some embodiments, all of the steps are performed in a base station. In other embodiments, certain steps, for example the dynamic allocation, can be performed in another network element if centralized scheduling is performed.

Figure 7:
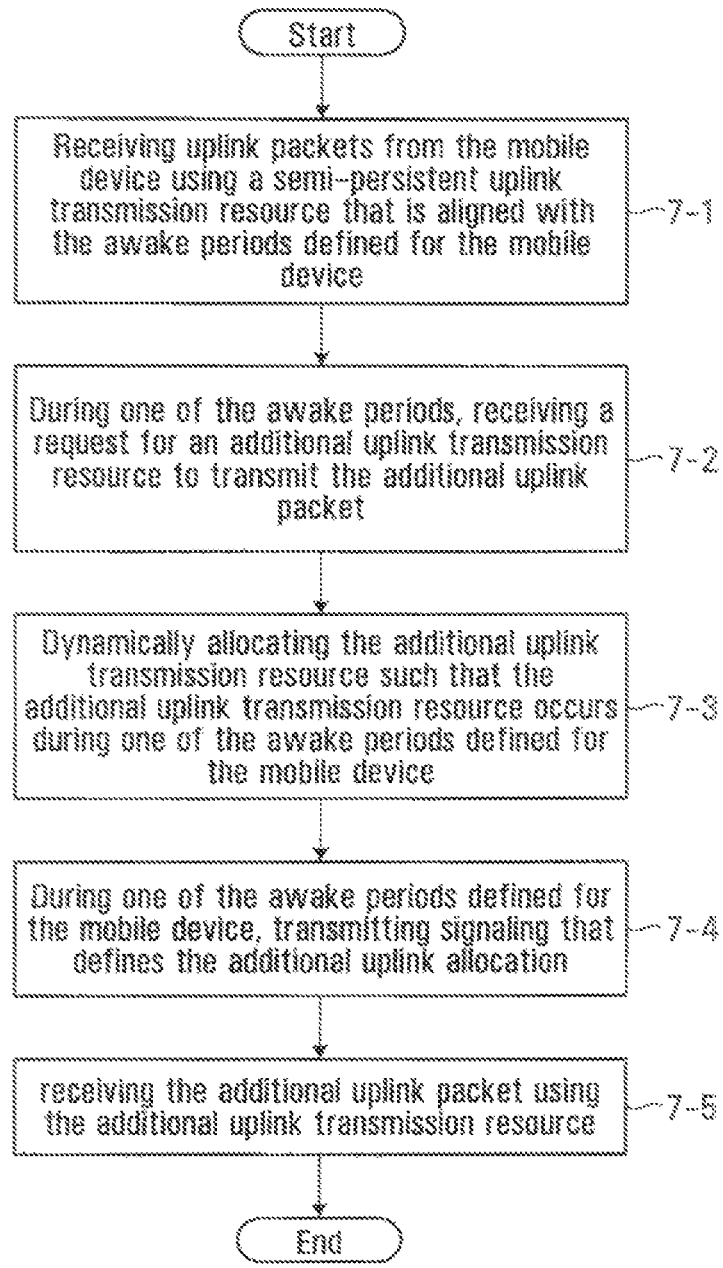

A method in a wireless network for performing uplink reception from mobile devices will be described with reference to the flowchart of FIG. 7. These steps are performed for each mobile device being provided wireless access on a semi-persistent downlink transmission resource. The method begins with receiving uplink packets from the mobile device using a semi-persistent uplink transmission resource that is aligned with the awake periods defined for the mobile device. These can be VoIP packets during an uplink talk-spurt for a VoIP session involving the mobile device or otherwise. Steps

7-2, 7-3, 7-4 and 7-5 are performed for each additional each additional uplink packet for the mobile device. In step 7-2, during one of the awake periods, the wireless network receives a request for an additional uplink transmission resource to transmit the additional uplink packet. In step 7-3, the wireless network dynamically allocates the additional uplink transmission resource such that the additional uplink transmission resource occurs during one of the awake periods defined for the mobile device. In step 7-4, during one of the awake periods defined for the mobile device, the wireless network transmits signaling that defines the additional uplink allocation. In step 7-5, the wireless network receives the additional uplink packet using the additional uplink transmission resource.

In some embodiments, the wireless network transmits signaling to each mobile device that defines the awake periods and that defines sleep periods of that mobile device and/or that defines the semi-persistent uplink and/or downlink transmission resource of that mobile device. For VoIP, the signaling to define the semi-persistent resources might be done at the start of each VoIP session. Such signaling can be performed on a channel that is dedicated to each mobile device, or using a broadcast channel containing such signaling for multiple devices.

Figure 8:
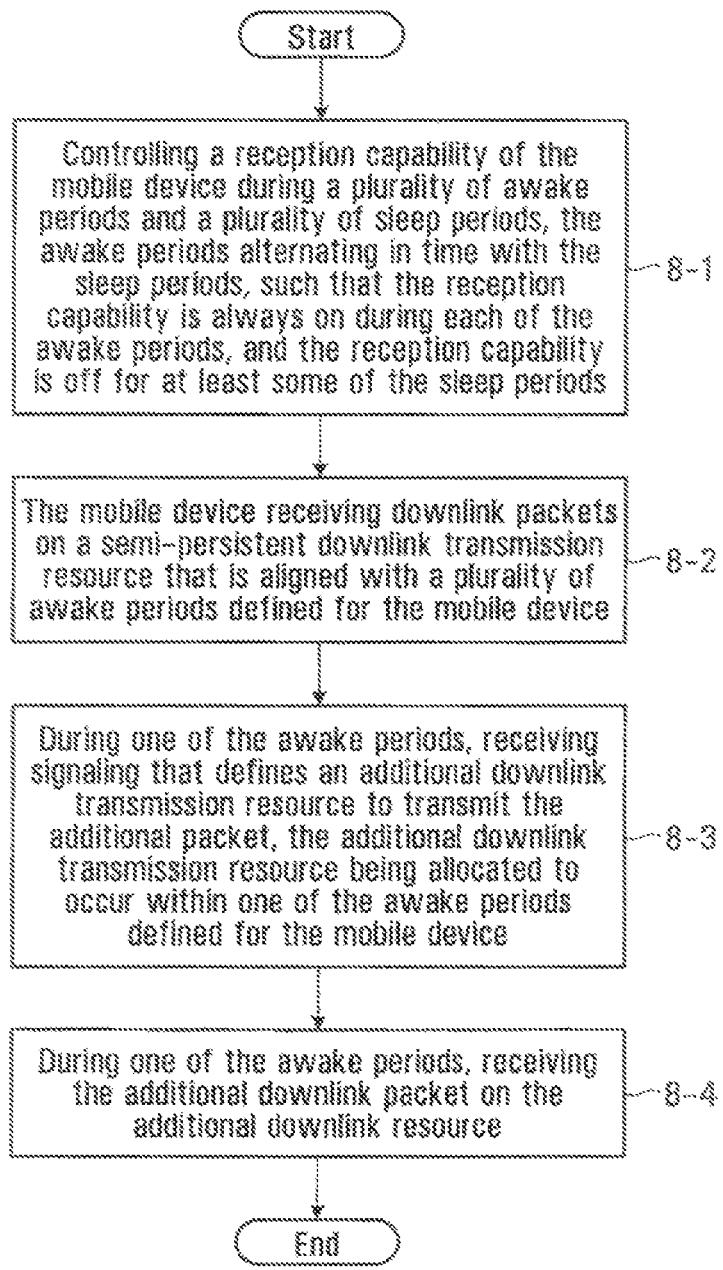
FIGS. 8 and 9 are flowcharts of methods executed by a mobile device to perform combined semi-persistent and dynamic scheduling.

Methods for Semi-Persistent Scheduling and DRX Control Executed by the Mobile Device Referring now to FIG. 8, a method of receiving downlink transmission executed by a mobile device will now be described. The method begins at step 8-1 with the mobile device controlling a reception capability of the mobile device during a plurality of awake periods and a plurality of sleep periods, the awake periods alternating in time with the sleep periods, such that the reception capability is always on during each of the awake periods, and the reception capability is off for at least some of the sleep periods. On a nominal basis, typically the reception capability will be off for every sleep period. At step 8-2, the mobile device receives downlink packets on a semi-persistent downlink transmission resource that is aligned with a plurality of awake periods defined for the mobile device. These can be VoIP downlink packets during a downlink talk-spurt for a VoIP session involving the mobile device, or otherwise. Steps 8-3 and 8-4 are performed for each additional downlink packet for the mobile device. In step 8-3, during one of the awake periods, the mobile device receives signaling that defines an additional downlink transmission resource to transmit the additional packet, the additional downlink transmission resource being allocated to occur within one of the awake periods defined for the mobile device. In step 8-4, during one of the awake periods, the mobile device receives the additional downlink packet on the additional downlink resource.

The mobile device may receive signaling that defines the awake periods and the sleep periods of the mobile device and/or that defines the semi-persistent downlink transmission resource of that mobile device. This may take place over a respective dedicated channel for the mobile device or over a broadcast channel containing signaling information for the mobile device and other mobile devices.

Figure 9:
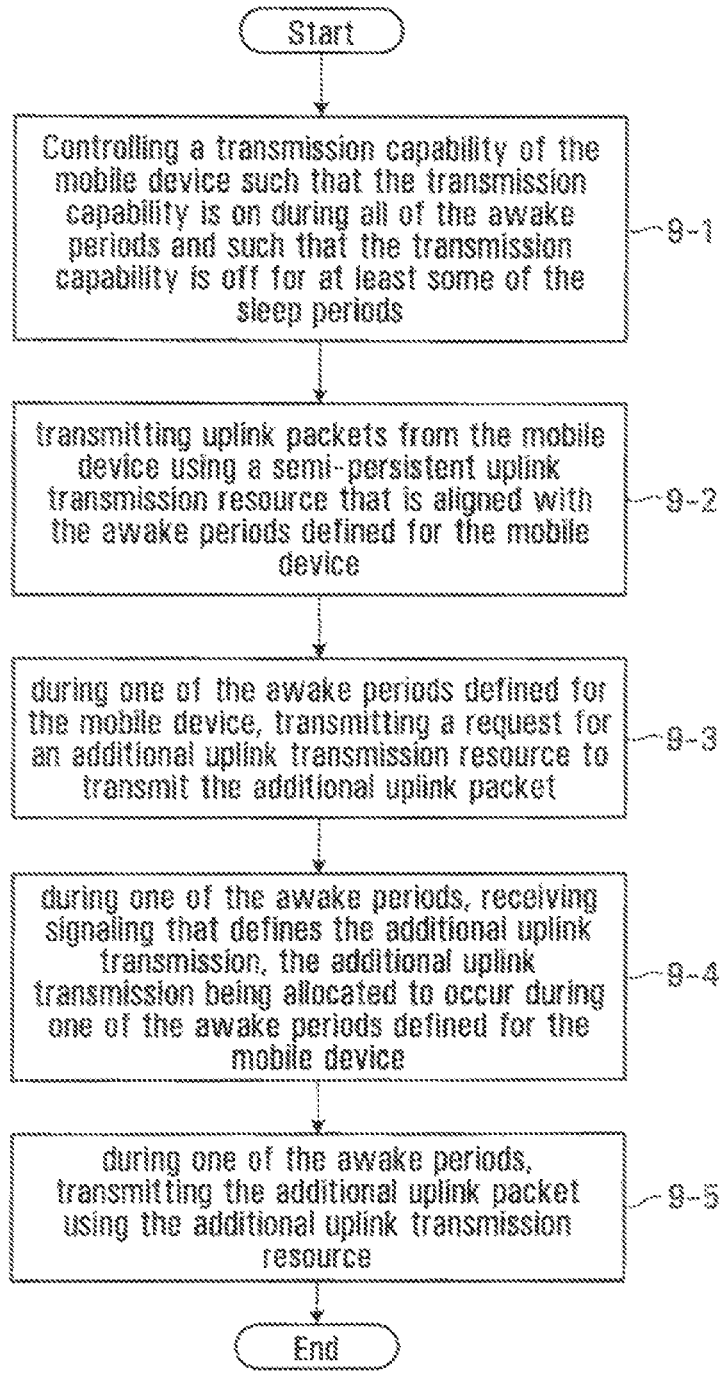

Referring now to FIG. 9, a method of transmitting uplink transmissions executed by a mobile device will now be described. The method begins at step 9-1 with controlling a transmission capability of the mobile device such that the transmission capability is on during all of the awake periods and such that the transmission capability is off for at least some of the sleep periods. In step 9-2, the mobile device transmits uplink packets (VoIP packets or otherwise) using a semi-persistent uplink transmission resource that is aligned with the awake periods defined for the mobile device. Steps 9-3, 9-4, 9-5 are executed for each additional uplink packet for the mobile device. In step 9-3, during one of the awake periods defined for the mobile device, the mobile device transmits a request for an additional uplink transmission resource to transmit the additional uplink packet. In step 9-4, during one of the awake periods, the mobile device receives signaling that defines the additional uplink transmission resource, the additional uplink transmission resource being allocated to occur during one of the awake periods defined for the mobile device. In step 9-5, during one of the awake periods, the mobile device transmits the additional uplink packet using the additional uplink transmission resource.

The mobile device may receive signaling that defines the semi-persistent uplink resource. In some embodiments, the request for an additional uplink allocation is transmitted using a contention based random access channel.

Additional Embodiments

The following variants can be applied in combination with previously described embodiments.

In some embodiments, the awake period that is aligned with the semi-persistent resource is provisioned to have a duration that is long enough that it also includes times that the mobile device is expected to transmit/receive an ACK/NACK in respect of a transmission on semi-persistent resource allocation for the uplink and/or the downlink. In some embodiments, where an ACK/NACK is expected (as will be the case when the semi-persistent allocation is active), the awake period is extended to allow for this.

In another embodiment, additional awake periods are provisioned that are aligned with times that the mobile device is expected transmit/receive an ACK/NACK. More specifically, in such embodiments, a DRX/DTX period is provisioned between an awake period for a voice packet (semi-persistent resource allocation) and an awake period for the ACK/NACK. CCEs transmitted during either of the awake periods can be used to signal a dynamic allocation for the uplink and/or downlink. In addition, in some embodiments, during the extended awake period, the mobile device is permitted to make requests for dynamic allocations for the uplink.

In some embodiments, the sleep period is used for downlink retransmissions, and the mobile device will have its reception capability on in the event a retransmission is expected. Similarly, in some embodiments, the sleep period is used for uplink retransmissions, and the mobile device will have its transmission capability on to allow for this. The mobile device will not be expecting dynamic allocations during such periods. In some embodiments, additional awake periods are configured for retransmissions on the uplink and/or downlink. During these additional awake periods, the CCEs can be used to signal possible dynamic allocations. In some embodiments, one or more of the nominal awake periods is made longer so as to allow for the transmission/reception of retransmissions. In this case, the CCEs of the longer awake periods are available for dynamic scheduling purposes.

In some embodiments, as described in the detailed examples above, the dynamic allocations are always scheduled to occur during one of the awake periods that are nominally defined with fixed duration. In another embodiment, an awake period can be extended to allow for the transmission/reception of one or more dynamic allocations. For example, a CCE sent during an awake period can allocate a dynamic resource allocation that occurs partially or entirely outside the awake period, and the mobile device stays powered on to allow that. During the period that the mobile device is powered on as a result of the dynamic resource allocation the mobile device continues to monitor the CCEs, and an additional CCE signalling another dynamic allocation can be sent and so on.

Controlling the Start of DRX Control

DRX (discontinuous reception) control refers generally to methods of controlling a mobile device to have discontinuous reception capability so as to reduce batter consumption. This means there will be periods that the mobile device will have its receiver on (an on period, also referred to as an awake period), and periods that the mobile device will have its receiver off (an off period, also referred to as a sleep period). Many different examples of methods of DRX control have been provided above.

In accordance with further embodiments, various methods for starting DRX control are provided. Typically one or more DRX parameters are sent to the mobile device to configure DRX control. These might include one or more parameters that indicate when the receiver of the mobile device will be powered on. They might also include one or more parameters that indicate an off period duration, although separate signalling to this effect might not be necessary if it can be deduced from the signalling that indicates the on periods. In some embodiments, the parameters also indicate an extension period during which the mobile device will continue have its receiver powered on following one of said periods during which the mobile device will have its receiver powered on if there is a dynamic scheduling allocation. These methods may for example be implemented by one or both of a DRX controller (such as DRX controller 29 forming part of a wireless network 28 of FIG. 2) or a radio manager (such as a radio manager 14 forming part of a mobile device 10 of FIG. 2).

It should be apparent from the foregoing that in some embodiments, the periods that the mobile device will have its receiver on, and the periods that the mobile device will have its receiver off may be nominal on and off durations respectively, subject to over-ride. In the example presented above, the nominal on period can be extended to accommodate dynamic scheduling. Other examples of how the nominal on and off durations may be varied include for transmitting/receiving ACKs/NACKs and transmitting/receiving retransmissions. Further details of such examples can be found in Applicants' co-pending Application No. 60/974,653 filed Sep. 24, 2007 hereby incorporated by reference in its entirety.

Figure 11:
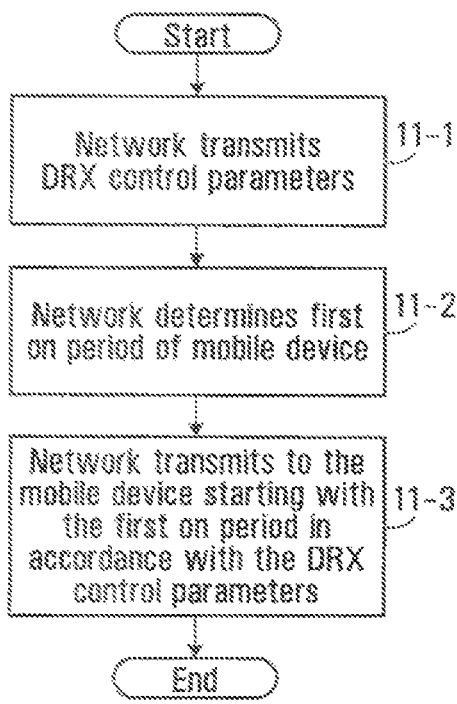
FIG. 11 is a flowchart of a method for a network to determine a start time for discontinuous reception control.
Figure 12:
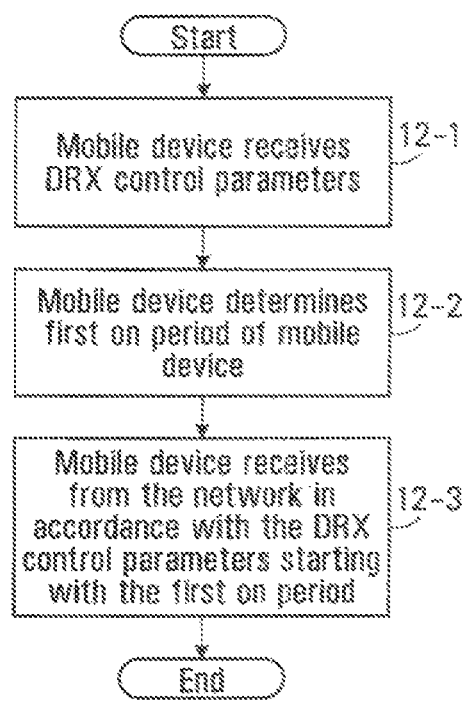
FIG. 12 is a flowchart of a method for a network to determine a start time for discontinuous reception control.

Referring to FIGS. 11 and 12, shown are flowcharts of two methods that are implemented in the network and mobile device respectively. References to steps executed by the network refer to steps that are executed by some component(s) in a network, as opposed to the mobile device. Examples of network components that might execute one or more of these steps include a base station, or an enhanced Node B (ENB). These methods occur in parallel and will be described as such. At step 11-1, the network transmits DRX control parameters to the mobile device. These parameters may include parameters that indicate periods during which the mobile device will have its receiver powered on, and an extension period during which the mobile will continue have its receiver on even at the end of the on period when dynamic scheduling allocation is detected, once discontinuous reception control is active. In some embodiments the parameters also indicate periods during which the mobile device will have its receiver powered off. They may also include parameters relating to semi-persistent assignment. They may also include parameters relating to how larger additional packets are to be handled. These parameters are typically sent at the start of a communications session between the mobile device and the network, for example at the start of a VoIP session. At step 12-1, the mobile device receives the DRX control parameters. At steps 11-2 and 12-2, the network and the mobile device determine the first of the periods that the mobile device will have its receiver powered on. There are various methods for this that are detailed below, but in each case it is advantageous that both the network and mobile device make the same determination. For example, in some cases, the network defines the start time and signals this to the mobile device. At step 11-3, the network transmits to the mobile device, starting with the first on period, in accordance with the DRX parameters after which DRX control is active. Similarly, at step 12-3, the mobile device receives from the network, starting with the first on period, in accordance with the DRX parameters.

Various specific methods for the network and mobile device to determine the first on period will now be described.

A) Network Defines on Period, and Signals this to Mobile Device

Figure 13:
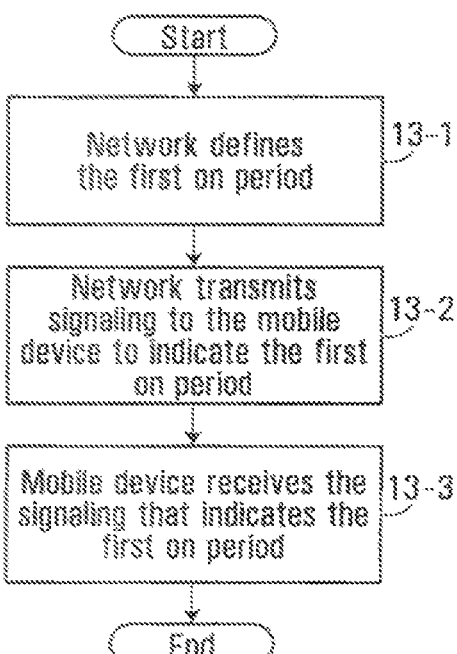
FIG. 13 is a flowchart of a method for a network and mobile station to determine a start time for discontinuous reception control in which the network transmits signalling to the mobile device.

A first method for the network and mobile device to determine the first on period will now be described with reference to FIG. 13. This flowchart includes steps executed by the network, and steps executed by the mobile device. The method begins with the network defining the first on period at step 13-1. For example, in semi-persistent scheduling case, the network might define the first on period such that the pre-configured resource occurs during the first on period. At step 13-2, the network transmits signalling to the mobile device to indicate the first on period. Various examples are given below. At step 13-3, the mobile device receives the signalling that indicates the first on period.

Absolute Value of Start Time.

In a first example of the network sending signalling to indicate the first on period, the network sends a signaling message to the mobile device that indicates in absolute terms the start time of the DRX control. In some embodiments, this is sent together with the other DRX parameters in which case an additional message is not required. The start time of the DRX control identifies the start time of the first on period for the DRX control.

In a specific example, the start time can be represented by a layer 1 sub-frame index or a layer 2 frame index. Transmission period is divided into layer 1 sub-frames having a duration known to both the network and mobile devices. Thus, reference to a specific layer 1 sub-frame will be a reference to a specific time. In some embodiments, layer 1 sub-frames are 1 ms in duration, but other values are possible, and more generally the sub-frame duration is implementation specific. A layer 1 sub-frame index is simply a reference to a specific layer 1 sub-frame. In some embodiments, the layer 1 sub-frame index is a cyclically repeating index, for example starting at zero, counting up to 4095, and then starting at zero again. In such a case, the start time signaled by way of sub-frame index will refer to the next layer 1 sub-frame having that index.

Relative Value of Start Time

In a second example of the network sending signalling to indicate the first on period, the network sends a signaling message to the mobile device that indicates the start time of the DRX control in relative terms. For example, the network may transmit signaling to the mobile device that includes an activation timer duration. The activation timer duration identifies the start of the DRX control relative to when the signaling was sent or received, thereby indicating when the first on period will occur. The mobile device starts a timer, and when the timer reaches the activation timer duration, the DRX procedure starts. This timer might for example be represented in terms of number of layer-1 sub-frames (for example number of TTIs (transmission time intervals), or an actual time value. In some embodiments, the activation timer duration is sent along with other DRX parameters.

B) Default Configuration

Figure 14:
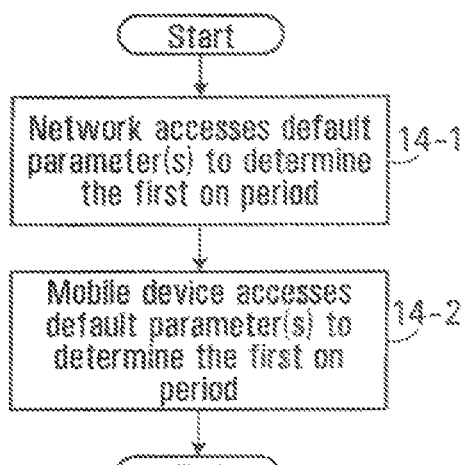
FIG. 14 is a flowchart of a method for a network and mobile station to determine a start time for discontinuous reception control in which the both the network and the mobile device access default parameters to determine the first on period.

In another embodiment, the mobile device has a default configuration that defines when the first on time will be. When a default configuration is employed, both the network and the mobile device need to be aware of the default configuration to be employed for a given mobile device, and to act accordingly. This method for the network and mobile device determine the first on period will now be described with reference to FIG. 14. This flowchart includes steps executed by the network, and steps executed by the mobile device. The method begins with the network accessing default parameter(s) to determine the first on period at step 14-1. For example, the first on-duration may be defined by default to start with the sub-frame that aligns with the semi-persistent resource. At step 14-2, the mobile device accesses default parameter(s) to determine the first on period. For example, the mobile device may be configured by default to assume that the first on-duration starts with the sub-frame that aligns with the semi-persistent resource. These default configurations are pre-configured at both the network (for example in an ENB) and the mobile device.

In a first example of the default configuration approach, the start time of the first on period is aligned with the first sub-frame in which the mobile device is assigned a semi-persistent resource, following the assignment of that semi-persistent resource.

In a second example of the default configuration approach, the first on period always occurs at a certain sub-frame index. For example, using the example of 4096 layer-1 sub-frame indexes that cyclically repeat, a given mobile device might be configured to have a first on period following sub-frame 400. In that case, after configuring the mobile device to with other DRX parameters, the first on period will occur following the next occurrence of sub-frame 400.

Another Mobile Device

Figure 10:
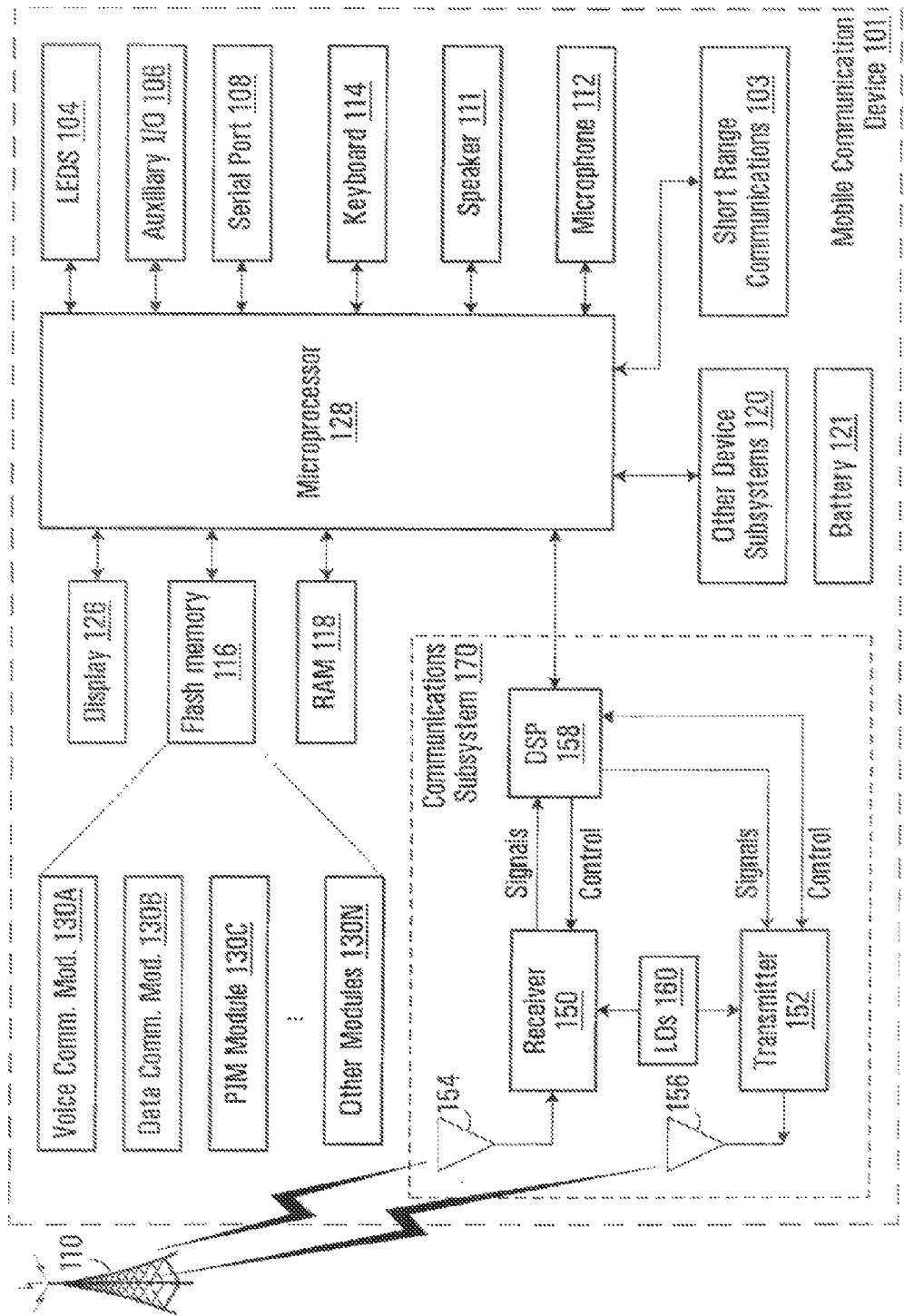
FIG. 10 is a block diagram of a mobile device.

Referring now to FIG. 10, shown is a block diagram of another mobile device that may implement any of the mobile device methods described herein. The mobile device 101 is shown with specific components for implementing features similar to those of the mobile device 10 of FIG. 2. It is to be understood that the mobile device 101 is shown with very specific details for example purposes only.

A processing device (a microprocessor 128) is shown schematically as coupled between a keyboard 114 and a display 126. The microprocessor 128 may be a specific example of the processor with features similar to those of the processor 16 of the mobile device 10 shown in FIG. 2. The microprocessor 128 controls operation of the display 126, as well as overall operation of the mobile device 101, in response to actuation of keys on the keyboard 114 by a user.

The mobile device 101 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile device 101 are shown schematically. These include: a communications subsystem 170; a short-range communications subsystem 103; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 101 may have a battery 121 to power the active elements of the mobile device 101. The mobile device 101 is in some embodiments a two-way radio frequency (RF) communication device having voice and data communication capabilities. In addition, the mobile device 101 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 101 may also be stored to the RAM 118.

The microprocessor 128, in addition to its operating system functions, enables execution of software applications on the mobile device 101. A predetermined set of software applications that control basic device operations, such as a voice communications module 130A and a data communications module 130B, may be installed on the mobile device 101 during manufacture. In addition, a personal information manager (PIM) application module 130C may also be installed on the mobile device 101 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture. One or more of the modules 130A,130B,130C,130N of the flash memory 116 can be configured for implementing features similar to those of the radio manager 14 of the mobile device 10 shown in FIG. 2.

Communication functions, including data and voice communications, are performed through the communication subsystem 170, and possibly through the short-range communications subsystem 103. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The communication subsystem 170 having the transmitter 152 and the receiver 150 is an implementation of a specific example of the wireless access radio 12 of the mobile device 10 shown in FIG. 2. The specific design and implementation of the communication subsystem 170 is dependent upon the communication network in which the mobile device 101 is intended to operate. For example, the communication subsystem 170 of the mobile device 101 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. The communication subsystem 170 may also be designed to operate with an 802.11 Wi-Fi network, and/or an 802.16 WiMAX network. Other types of data and voice networks, both separate and integrated, may also be utilized with the mobile device 101.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 101 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 101. In addition, the display 126 may also be utilized in voice communication mode, for example, to display the identity of a calling party, the duration of a voice call, or other voice call related information.

The short-range communications subsystem 103 enables communication between the mobile device 101 and other proximate systems or devices, which need not necessarily be similar devices. For example, the short-range communications subsystem may include an infrared device and associated circuits and components, or a Bluetooth™ communication module to provide for communication with similarly-enabled systems and devices.

Numerous modifications and variations of the present application are possible in light of the above teachings. It is therefore to be understood that within the scope of the appended claims, the application may be practised otherwise than as specifically described herein.

I claim:

1. A method, comprising:
receiving, from a network, by a mobile device, signaling comprising a DRX control parameter that indicates a first DRX awake period, the signaling configuring the mobile device to operate in a DRX control mode that includes DRX sleep periods and DRX awake periods; and
during each of a plurality of DRX awake periods, monitoring for a dynamically-allocated resource, a plurality of downlink layer 1 control channel elements (CCE's) in each of a plurality of consecutive sub-frames of that DRX awake period.

2. The method of claim 1, further comprising receiving, from the network, signaling comprising a DRX control parameter that indicates an extension period during which the mobile device will continue to monitor a plurality of downlink layer 1 CCE's following one of said DRX awake periods for a dynamic scheduling allocation.

3. The method of claim 1, wherein the signaling indicates the first of said DRX awake periods in absolute terms.

4. The method of claim 1, further comprising receiving a downlink transmission using the dynamically-allocated resource.

5. The method of claim 1, wherein the signaling indicates the first of said DRX awake periods in relative terms.

6. The method of claim 5 wherein the signaling indicating the first of said DRX awake periods in relative terms comprises signaling that indicates an activation-timer duration.

7. The method of claim 6 wherein receiving the activation-timer duration comprises at least one of:
receiving the activation-timer duration in units of layer-1 sub-frames; or
receiving the activation-timer duration in units of actual time.

8. A mobile device, comprising:
one or more processors configured to:
receive, from a network, signaling comprising a DRX control parameter that indicates a first DRX awake period, the signaling configuring the mobile device to operate in a DRX control mode that includes DRX sleep periods and DRX awake periods; and
during each of a plurality of DRX awake periods, monitor for a dynamically-allocated resource, a plurality of downlink layer 1 control channel elements (CCE's) in each of a plurality of consecutive sub-frames of that DRX awake period.

9. The mobile device of claim 8, the one or more processors further configured to receive, from the network, signaling comprising a DRX control parameter that indicates an extension period during which the mobile device will continue to monitor a plurality of downlink layer 1 CCE's following one of said DRX awake periods for a dynamic scheduling allocation.

10. The mobile device of claim 8, wherein the signaling indicates the first of said DRX awake periods in absolute terms.

11. The mobile device of claim 8, the one or more processors further configured to receive a downlink transmission using the dynamically-allocated resource.

12. The mobile device of claim 8, wherein the signaling indicates the first of said DRX awake periods in relative terms.

13. The mobile device of claim 12, wherein the signaling indicating the first of said DRX awake periods in relative terms comprises signaling that indicates an activation-timer duration.

14. The mobile device of claim 13, wherein the one or more processors configured to receive the activation-timer duration comprises the one or more processors configured to:
   receive the activation-timer duration in units of layer-1 sub-frames; or
   receive the activation-timer duration in units of actual time.

15. A non-transitory computer readable medium storing instructions to cause a processor to perform operations comprising:
   receiving, from a network, by a mobile device, signaling comprising a DRX control parameter that indicates a first DRX awake period, the signaling configuring the mobile device to operate in a DRX control mode that includes DRX sleep periods and DRX awake periods; and
   during each of a plurality of DRX awake periods, monitoring for a dynamically-allocated resource, a plurality of downlink layer 1 control channel elements (CCE's) in each of a plurality of consecutive sub-frames of that DRX awake period.

16. The computer readable medium of claim 15, further comprising receiving, from the network, signaling comprising a DRX control parameter that indicates an extension period during which the mobile device will continue to monitor a plurality of downlink layer 1 CCE's following one of said DRX awake periods for a dynamic scheduling allocation.

17. The computer readable medium of claim 15, wherein the signaling indicates the first of said DRX awake periods in absolute terms.

18. The computer readable medium of claim 17, the instructions further comprising receiving a downlink transmission using the dynamically-allocated resource.

19. The computer readable medium of claim 15, wherein the signaling indicates the first of said DRX awake periods in relative terms.

20. The computer readable medium of claim 19, wherein the signaling indicating the first of said DRX awake periods in relative terms comprises signaling that indicates an activation-timer duration.

21. The computer readable medium of claim 20, wherein receiving the activation-timer duration comprises at least one of:
   receiving the activation-timer duration in units of layer-1 sub-frames; or
   receiving the activation-timer duration in units of actual time.

* * * * *